(12) United States Patent
Sverrisson

(10) Patent No.: US 8,560,217 B2
(45) Date of Patent: Oct. 15, 2013

(54) SYSTEM AND METHOD FOR PREDICTING VEHICLE ROLLOVER USING POSITION TRACKING

(75) Inventor: Heimir Sverrisson, Portsmouth, NH (US)

(73) Assignee: Cadec Global, Inc., Manchester, NH (US)

( * ) Notice: Subject to any disclaimer, the term of this patent is extended or adjusted under 35 U.S.C. 154(b) by 901 days.

(21) Appl. No.: 12/139,838

(22) Filed: Jun. 16, 2008

(65) Prior Publication Data

US 2008/0312813 A1    Dec. 18, 2008

Related U.S. Application Data

(60) Provisional application No. 60/934,750, filed on Jun. 15, 2007.

(51) Int. Cl.
*B60T 8/1755* (2006.01)

(52) U.S. Cl.
USPC ............... 701/124; 701/70; 701/93; 702/155

(58) Field of Classification Search
USPC .................. 701/124, 29, 70, 93; 702/155
See application file for complete search history.

(56) References Cited

U.S. PATENT DOCUMENTS

| | | | |
|---|---|---|---|
| 5,775,230 A * | 7/1998 | Joos | 105/199.2 |
| 5,801,618 A | 9/1998 | Jenkins | |
| 5,949,375 A * | 9/1999 | Ishiguro et al. | 342/457 |
| 6,122,584 A | 9/2000 | Lin et al. | |
| 6,374,171 B2 * | 4/2002 | Weiberle et al. | 701/71 |
| 6,819,980 B2 | 11/2004 | Bauer et al. | |
| 6,862,512 B2 * | 3/2005 | Arndt et al. | 701/70 |
| 7,031,816 B2 * | 4/2006 | Lehmann et al. | 701/48 |
| 7,057,503 B2 * | 6/2006 | Watson | 340/440 |
| 7,162,340 B2 * | 1/2007 | Schubert et al. | 701/38 |
| 7,353,098 B2 * | 4/2008 | Sakata | 701/38 |
| 7,463,963 B2 * | 12/2008 | Higuchi | 701/70 |
| 7,702,440 B2 * | 4/2010 | Wu et al. | 701/45 |
| 2004/0102894 A1 * | 5/2004 | Holler | 701/124 |
| 2005/0102085 A1 * | 5/2005 | Sakata | 701/72 |
| 2005/0216163 A1 * | 9/2005 | Sakata | 701/70 |
| 2005/0225477 A1 * | 10/2005 | Cong et al. | 342/70 |
| 2005/0236896 A1 * | 10/2005 | Offerle et al. | 303/146 |
| 2006/0129298 A1 * | 6/2006 | Takeda | 701/70 |
| 2007/0067085 A1 | 3/2007 | Lu et al. | |
| 2007/0155458 A1 * | 7/2007 | Tipping et al. | 463/6 |
| 2008/0133101 A1 * | 6/2008 | Woywod et al. | 701/83 |
| 2008/0275664 A1 * | 11/2008 | Schmid et al. | 702/141 |
| 2009/0187323 A1 * | 7/2009 | Schermann et al. | 701/72 |
| 2009/0306859 A1 * | 12/2009 | Tichy et al. | 701/46 |
| 2010/0036597 A1 * | 2/2010 | Fiedler et al. | 701/124 |
| 2010/0235035 A1 * | 9/2010 | Nishira et al. | 701/29 |

* cited by examiner

*Primary Examiner* — Tuan C. To
(74) *Attorney, Agent, or Firm* — Peter A. Nieves; Sheehan Phinney Bass + Green PA

(57) ABSTRACT

A method of predicting vehicle rollover is provided to assist in preventing vehicle rollover. The method contains the steps of: determining a center of gravity of a vehicle; determining an actual lateral acceleration of the vehicle; determining a maximum lateral acceleration of the vehicle; and determining if the actual lateral acceleration is more than a predefined percentage of the maximum lateral acceleration. When the actual lateral acceleration is more than the predefined percentage of the maximum lateral acceleration, a warning is issued to the driver such that preventative measures can be taken to avoid a rollover.

14 Claims, 4 Drawing Sheets

SYSTEM AND METHOD FOR PREDICTING VEHICLE ROLLOVER USING POSITION TRACKING

CROSS-REFERENCE TO RELATED APPLICATIONS

This application claims priority to copending U.S. Provisional Application entitled, "PREDICTING VEHICLE ROLLOVER USING POSITION TRACKING," having Ser. No. 60/934,750, filed Jun. 15, 2007, which is entirely incorporated herein by reference.

FIELD OF THE INVENTION

The present invention generally relates to vehicle condition maintenance, and more particularly is related to a system and method for assisting in avoiding vehicle rollover.

BACKGROUND

Devices and methods to improve driver safety are continuously developed to counter perceivable risks of driving. Vehicle rollover during turning is one risk that has not been adequately addressed. Rollover of a vehicle occurs when lateral acceleration due to turning causes a center of gravity (CG) of the vehicle to extend past the road-contacting tires. Once the tires on the inside of the vehicle turn path depart from the road surface, the ability to take corrective action to prevent further vehicle roll is greatly reduced.

The susceptibility of vehicles to rolling over is related to the location of the center of gravity of the vehicle in relation to the tires. Wheel departure occurs when the force of gravity acting to keep tires of a vehicle on the road is overcome by a lateral force acting on the vehicle while turning. This lateral force creates a moment of inertia about the tires on the outside of the vehicle turn path. The angle made between a line passing through a tire and the center of gravity, and a vertical line through the center of gravity is determinative of how those forces contribute to the moment of inertia about the tires.

The higher the center of gravity is in relation to the road, the smaller the angle, and the less effect gravity has on the moment of inertia. Therefore, trucks, vans, sport utility vehicles, and especially commercial trucking vehicles are more at risk of rollover than sedans and coupes, for example. Therefore, it is desirable for there to be a way to warn a driver of a potential rollover situation so that corrective action can be taken to prevent rollover.

SUMMARY

Embodiments of the present invention provide a system and method for predicting vehicle rollover using position tracking. Briefly described, the method of predicting vehicle rollover assists in preventing vehicle rollover. The method contains the steps of: determining a center of gravity of a vehicle; determining an actual lateral acceleration of the vehicle; determining a maximum lateral acceleration of the vehicle; and determining if the actual lateral acceleration is more than a predefined percentage of the maximum lateral acceleration. When the actual lateral acceleration is more than the predefined percentage of the maximum lateral acceleration, a warning is issued to the driver such that preventative measures can be taken to avoid a rollover.

In architecture, the system for predicting vehicle rollover using position tracking contains logic configured to determine a center of gravity of a vehicle, logic configured to determine an actual lateral acceleration of the vehicle, logic configured to determine a maximum lateral acceleration of the vehicle, and logic configured to determine if the actual lateral acceleration is more than a predefined percentage of the maximum lateral acceleration.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention relates generally to a method of determining the approach of a rollover condition during vehicle turning, and more specifically, a method of using gathered positional data to determine the lateral acceleration of a vehicle during turning. When the determined lateral acceleration exceeds a first predetermined threshold or percentage of a maximum lateral acceleration, a warning is issued to the driver such that preventative measures can be taken to avoid a rollover.

To prevent rollover of a vehicle it is important to predict vehicle rollover. In order to predict vehicle rollover, it is necessary to compute lateral acceleration $a_c$ and compare that value to a maximum lateral acceleration $a_{c\text{-}max}$. The maximum lateral acceleration $a_{c\text{-}max}$ is determined based on the location of the center of gravity (CG) of a vehicle.

Figure 1:
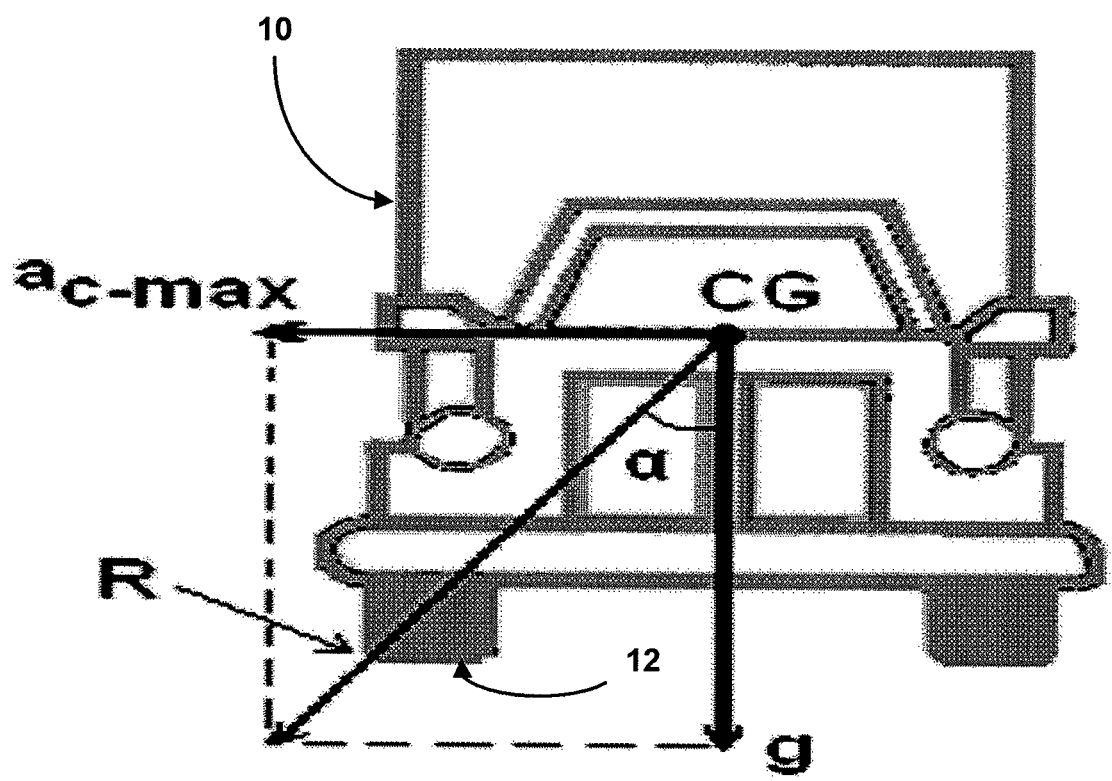
FIG. 1 is a schematic diagram illustrating a vehicle and factors affecting vehicle rollover.

FIG. 1 is a schematic diagram illustrating a vehicle 10 and factors affecting vehicle rollover. As seen in FIG. 1, on a horizontal surface, the angle between the direction of gravity (g) and a line drawn from the center of gravity (CG) of the vehicle 10 to a tire 12, where the tire is a tire that is on the outside of a turn when the vehicle 10 is turning, creates an angle ($\alpha$). When the lateral acceleration $a_c$ of the vehicle 10 is greater than gravity multiplied by the tangent of the angle $\alpha$ (i.e., $g \cdot \tan(\alpha)$), the lateral acceleration $a_c$ overpowers the gravitational acceleration acting on the vehicle 10 to keep all of the wheels on the ground. In other words, the effect of gravity g on the moment of inertia is overcome by the effect of the lateral force on the moment of inertia, tending the inside tires of the vehicle 10 to rotate away from the road. Therefore, setting the maximum lateral acceleration $a_{c\text{-}max}$ at $g \cdot \tan(\alpha)$, and not having actual lateral acceleration larger that the maximum lateral acceleration, will ensure that the tires of the vehicle will not depart from the road, thereby preventing vehicle rollover.

Figure 2:
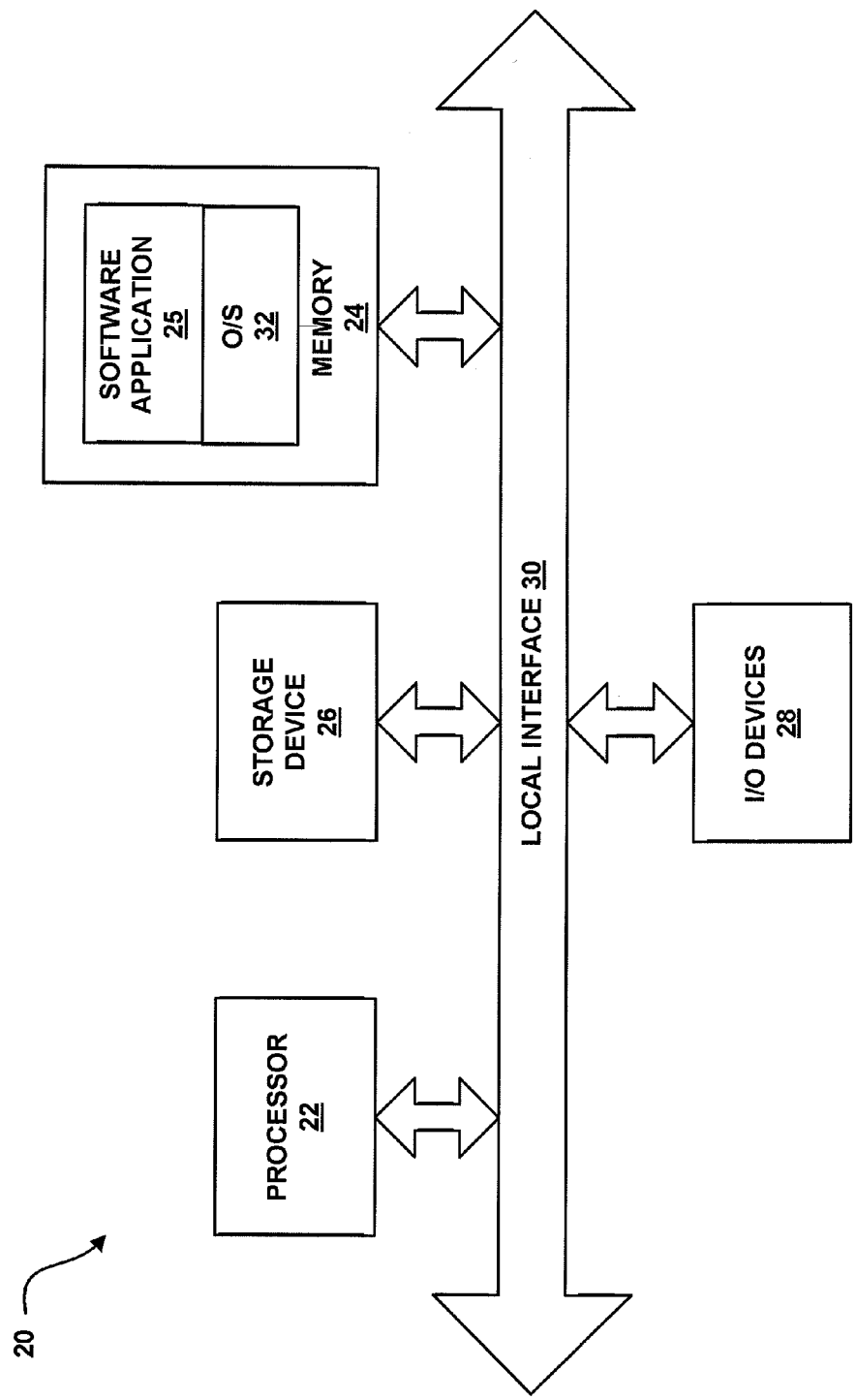
FIG. 2 is a block diagram illustrating an example of an on-board computer in accordance with one exemplary embodiment of the invention.

While the following describes steps that may be taken in accordance with the present invention to prevent vehicle rollover, it should be noted that computations performed by the present system and method may be provided by an onboard computer located within the vehicle 10. For exemplary purposes, FIG. 2 is a block diagram illustrating an example of an on-board computer 20 in accordance with one exemplary embodiment of the invention. It should be noted that the present system and method for predicting vehicle rollover using position tracking can be implemented in software (e.g., firmware), hardware, or a combination thereof. In the currently contemplated best mode, as mentioned in the present description, the present system and method is implemented in software, as an executable program, and is executed by a special or general purpose digital computer, such as the present on-board computer 20. Further description of the on-board computer 20, and interaction therewith is provided below.

Generally, in terms of hardware architecture, as shown in FIG. 2, the on-board computer 20 may include a processor 22, memory 24, storage device 26, and one or more input and/or output (I/O) devices 28 (or peripherals) that are communicatively coupled via a local interface 30. The local interface 30 can be, for example but not limited to, one or more buses or other wired or wireless connections, as is known in the art. The local interface 30 may have additional elements, which are omitted for simplicity, such as controllers, buffers (caches), drivers, repeaters, and receivers, to enable communication. Further, the local interface may include address, control, and/or data connections to enable appropriate communications among the aforementioned components.

The processor 22 is a hardware device for executing software, particularly that stored in the memory 24. The processor 22 can be any custom made or commercially available processor, a central processing unit (CPU), an auxiliary processor among several processors associated with the on-board computer 20, a semiconductor based microprocessor (in the form of a microchip or chip set), a macroprocessor, or generally any device for executing software instructions.

The memory 24 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 24 may incorporate electronic, magnetic, optical, and/or other types of storage media. Note that the memory 24 can have a distributed architecture, where various components are situated remote from one another, but can be accessed by the processor 22.

Software 25 within the memory 24 may include one or more separate programs, each of which comprises an ordered listing of executable instructions for implementing logical functions of the present system and method, as described below. In the example of FIG. 2, the software 25 in the memory 24 defines the functionality of the present system and method for predicting vehicle rollover using position tracking, in accordance with the present invention. In addition, the memory 24 may contain an operating system (O/S) 32. The operating system 32 essentially controls the execution of computer programs and provides scheduling, input-output control, file and data management, memory management, and communication control and related services.

The functionality of the present system and method for predicting vehicle rollover may be provided by a source program, executable program (object code), script, or any other entity comprising a set of instructions to be performed. When a source program, then the program needs to be translated via a compiler, assembler, interpreter, or the like, which may or may not be included within the memory 24, so as to operate properly in connection with the O/S 32. Furthermore, the functionality of the present system and method for predicting vehicle rollover can be written as (a) an object oriented programming language, which has classes of data and methods, or (b) a procedure programming language, which has routines, subroutines, and/or functions.

The I/O devices 28 may include input devices, for example but not limited to, a keyboard or microphone. Furthermore, the I/O devices 28 may also include output devices, for example but not limited to, a printer, display, or other output devices. Finally, the I/O devices 28 may further include devices that communicate via both inputs and outputs, for instance but not limited to, a modulator/demodulator (modem; for accessing another device, system, or network), a radio frequency (RF) or other transceiver, a telephonic interface, a bridge, a router, or other devices.

When the functionality of the present system and method for predicting vehicle rollover is implemented in software 25, as is shown in FIG. 2, it should be noted that the system and method functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present functionality can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
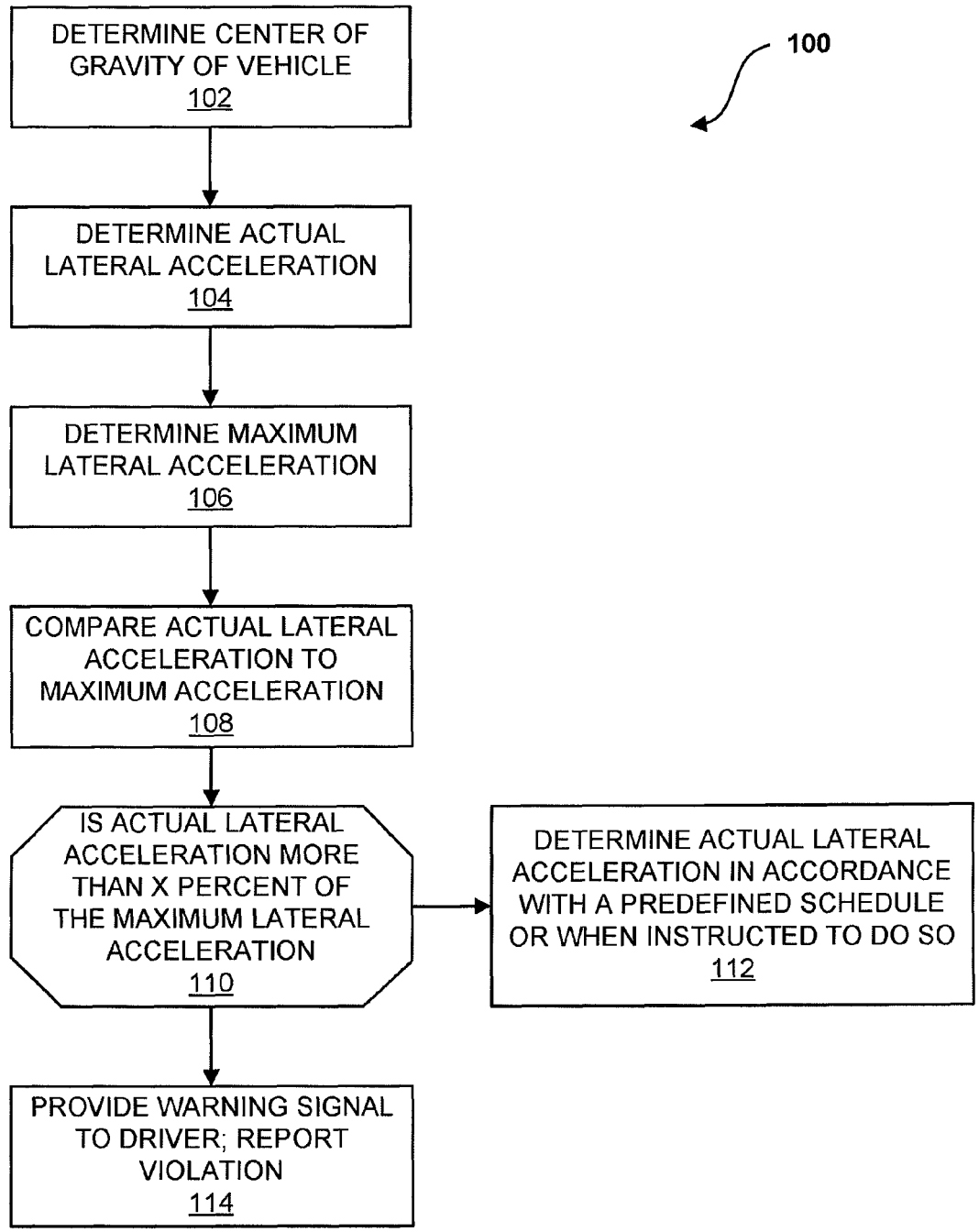
FIG. 3 is a flow chart illustrating a method of preventing vehicle rollover in accordance with the present invention.

As previously mentioned, setting the maximum lateral acceleration $a_{c\text{-}max}$ at $g \cdot \tan(\alpha)$, and not having actual lateral acceleration $a_c$ larger than the maximum lateral acceleration, will ensure that the tires of the vehicle will not depart from the road, thereby preventing vehicle rollover. FIG. 3 is a flow chart 100 illustrating a method of preventing vehicle rollover in accordance with the present invention. In accordance with the present invention, as a vehicle travels down a road, the rollover risk can be constantly calculated. Of course, one having ordinary skill in the art would appreciate that, in accordance with an alternative embodiment of the invention, the calculation may be performed only upon request. Such a request may come from a driver of the vehicle or from a remote location that is in communication with the onboard computer 20 via an I/O device 28.

It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 102, in order to determine the angle α, the location of the center of gravity of a vehicle is determined. The weight and build of the vehicle and the distribution of any cargo within the vehicle influence the location of the center of gravity, and therefore, the likelihood of rollover. Both vertical and lateral variations in the center of gravity affect the value of the angle α.

In a vehicle containing liquids, a worst-case center of gravity can be estimated based on the volume of liquid, its viscosity, and container shape. With solid cargo, however, the placement and weight of the cargo can be used to calculate the center of gravity. If the load varies during a trip, the worst-case center of gravity, resulting in the lowest value of the angle α, can be computed before the trip and used for calculations during the whole trip.

As is shown by block 104, the actual lateral acceleration $a_c$ of the vehicle is determined. The actual lateral acceleration $a_c$ acting on the vehicle going around a turn may be calculated with the following equation:

$$a_c = v^2/r \quad \text{(Eq. 1)}$$

In Eq. 1, v is the vehicle velocity and r is the radius of curvature of the vehicle travel path.

Figure 4:
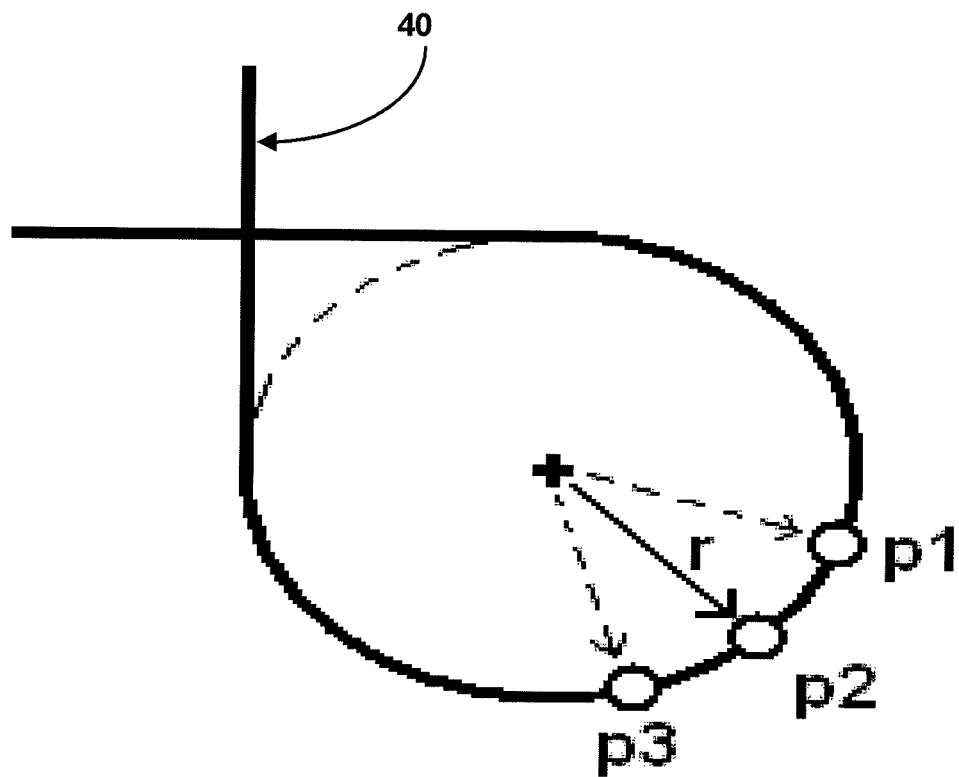
FIG. 4 is a schematic diagram illustrating three consecutive positions p1, p2, p3 within a curved line of travel that can be analyzed in accordance with the present invention.

Positional data of the vehicle is continuously gathered and analyzed to calculate the distance between discrete positions and the time difference between the measurements to determine the vehicle velocity v. To allow for position determination, the vehicle may contain a Global Positioning System (GPS) receiver therein. The gathering and analysis of positional data may be performed by the onboard computer 20 or at a remote location capable of communicating with the on-board computer 20. Similarly, the radius of a curved line of travel can be determined using positional data. For example, FIG. 4 is a schematic diagram illustrating three consecutive positions p1, p2, p3 within a curved line of travel 40 that can be analyzed. The radius r of a circle that passes through the three consecutive positions p1, p2, p3 can be calculated.

Positional data can be gathered using various methods. As previously mentioned, one method of gathering positional data is through a GPS. As is known by those having ordinary skill in the art, GPS gathers data from multiple low-orbit satellites to triangulate position. Data regarding latitude, longitude, and altitude can be gathered via GPS with high accuracy several times per second. This positional and temporal data can be analyzed to provide the data required to determine vehicle velocity v and radius of curvature. It should be noted that the analysis of positional and temporal data may be performed by the onboard computer or at a remote location for transmitting to the on-board computer 20.

In accordance with an alternative embodiment of the invention, vehicle velocity v can be retrieved from direct measurements in other on-board systems. As an example, other means of gathering positional data can include ground-based signal generators such as wireless routers or cell-phone towers where the location of the signal generators are known, and the slight time-delays when receiving signals from each of the towers can provide a present location by triangulating the signals. Such a ground-based generator could be located within the vehicle. Because the method only relies on relative positions it is well suited to utilize such positioning systems as those based on inertia that can be applied where satellite and radio systems are not accessible, such as, but not limited to, in underground tunnels. The invention can also use any combination of positioning systems as its input for the calculations.

Referring back to the flow chart 100 of FIG. 3, a maximum lateral acceleration of the vehicle is determined (block 106). As mentioned hereinabove, the maximum lateral acceleration $a_{c\text{-}max}$ is equal to the following equation:

$$g \cdot \tan(\alpha) \quad \text{(Eq. 2)}$$

As is shown by block 108, the actual lateral acceleration is then compared to the maximum lateral acceleration. Calculation is then performed to determine if the actual lateral acceleration is more than X percent of the maximum lateral acceleration (block 110), where X is a number representing a percentage. Of course, the calculation may be to determine if the actual lateral acceleration is more than a predefined threshold, where the threshold is associated with the maximum lateral acceleration. If the actual lateral acceleration is not more than X percent of the maximum lateral acceleration, the on-board computer 20 continues to determine actual lateral acceleration $a_c$ in accordance with a predefined schedule or when instructed to do so (block 112). Alternatively, if the actual lateral acceleration is more than X percent of the maximum lateral acceleration the on-board computer 20 may cause one or more functions to occur, such as, but not limited to, providing a warning signal to a driver of the vehicle and/or reporting violation of the maximum lateral acceleration (block 114).

The following provides an example of functions performed when the actual lateral acceleration is more than X percent of the maximum lateral acceleration. When the actual lateral acceleration $a_c$ reaches a first percentage of the maximum lateral acceleration $a_{c\text{-}max}$, a warning can be issued to the driver of the vehicle. This first percentage can be set at any value, such as, for example, 50%. Furthermore, when the actual lateral acceleration $a_c$ reaches a second percentage of the maximum lateral acceleration $a_{c\text{-}max}$, a violation can be issued. This second percentage will be set at a higher value than the first percentage; for example, 75%. The warning should be given with enough time for the driver to be able to take protective measures such as reducing speed or increasing the radius of turning (turning out of the corner). Both warnings and violations can be collected when they happen, together with other information (i.e., driver information, time of day, speed and position). This data can optionally be transmitted to a back office system, either in real-time or later.

As previously mentioned, rollover prediction may be performed by the on-board computer 20 in the vehicle 10. The on-board computer 20 has a real-time stream of data containing the position of the vehicle 10. Optionally, the on-board computer 20 can receive real-time speed information instead of calculating the speed indirectly from the positions. When the preset warning and violation limits are reached a warning will be issued to the driver. The warning can be either audible, visible or both. Warnings and violations can also be stored on the on-board computer 20 for immediate or deferred transmission to a back office system that may be in communication with the on-board computer 20.

In accordance with an alternative embodiment of the invention, an optional extension of the present system and method can be used to calculate beforehand, based on road geometry information, the maximum safe speed for an upcoming curvature of the road. This maximum safe speed, or a predefined fraction thereof, can be communicated to the driver visually, verbally or both. It should be noted that the beforehand calculation may be performed based on different criteria. As an example, if a travel route has been defined for a trip made by a driver of a vehicle, the maximum safe speed of an upcoming curvature of the road along the predefined path may be calculated and provided to the driver. Since the route from start to destination may be calculated prior to the driver beginning their trip, or at any time during a trip, the maximum safe speed of an upcoming curvature of the road may be calculated and provided to the driver at any time.

While the present vehicle rollover prediction system and method would be most helpful in vehicles having a high center of gravity, such as, for example, semi-trucks, busses, and sport-utility vehicles, the present system and method would also be useful in vehicles having a lower center of gravity, such as. For example, sedans, coupes, and race cars. While high center of gravity is one factor in rollover propensity, speed is another, as is shown, for example, by equation one, which is used to calculate actual lateral acceleration $a_c$, so this invention can be useful for high speed vehicles as well.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of predicting vehicle rollover with a processor configured to execute instructions stored in a memory, comprising the steps of:
    determining a center of gravity of a vehicle at rest;
    continuously gathering and analyzing positional data of the vehicle to calculate distance between discrete positions and time difference between measurements;
    determining an actual lateral acceleration of the vehicle in motion, further comprising the steps of:
        determining a velocity of the vehicle based in part on said positional data;
        determining a radius of curvature of a vehicle travel path based in part on said positional data; and
        calculating said actual lateral acceleration of the vehicle based on the velocity of the vehicle and the radius of curvature of the vehicle travel path;
    determining a maximum lateral acceleration of the vehicle, wherein the maximum lateral acceleration is the maximum amount of lateral acceleration of the vehicle permissible prior to the vehicle rolling over, and wherein the maximum lateral acceleration includes a gravity component of the vehicle; and
    determining if the actual lateral acceleration is more than a predefined percentage of the maximum lateral acceleration.

2. The method of claim 1, further comprising the step of providing a driver of the vehicle with a warning if the actual lateral acceleration is more than the predefined percentage of the maximum lateral acceleration.

3. The method of claim 1, further comprising the step of reporting a violation performed by a driver of the vehicle if the actual lateral acceleration is more than the predefined percentage of the maximum lateral acceleration.

4. The method of claim 1, wherein the step of determining a center of gravity is continuously repeated.

5. The method of claim 1, wherein the positional data is gathered by a global positioning system.

6. The method of claim 1, where the radius of curvature is determined by determining a radius of a circle that passes through multiple positions within a curved line of travel of the vehicle.

7. The method of claim 1, wherein the step of determining a maximum lateral acceleration of the vehicle further comprises the steps of:
    determining an angle $\alpha$, where the angle $\alpha$ is an angle between a direction of gravity and a line drawn from a center of gravity of the vehicle to a tire of the vehicle that is on an outside of a turn when the vehicle is turning; and
    multiplying gravity by a tangent of the angle $\alpha$ resulting in the maximum lateral acceleration.

8. The method of claim 1, wherein the steps of determining a center of gravity of a vehicle, determining an actual lateral acceleration of the vehicle, determining a maximum lateral acceleration of the vehicle, and determining if the actual lateral acceleration is more than a predefined percentage of the maximum lateral acceleration are performed prior to the vehicle being on a vehicle travel path.

9. A system for predicting vehicle rollover, comprising:
    a processor; and
    a memory configured to store logic for execution on the processor, comprising:
        logic configured to determine a center of gravity of a vehicle at rest;
        logic configured to continuously gather and analyze positional data of the vehicle to calculate distance between discrete positions and time difference between measurements;
        logic configured to determine an actual lateral acceleration of the vehicle in motion, wherein the determining actual lateral acceleration further comprises:
            determining a velocity of the vehicle based in part on said positional data;
            determining a radius of curvature of a vehicle travel path based in part on said positional data; and
            calculating said actual lateral acceleration of the vehicle based on the velocity of the vehicle and the radius of curvature of the vehicle travel path;
        logic configured to determine a maximum lateral acceleration of the vehicle, wherein the maximum lateral acceleration is the maximum amount of lateral acceleration permissible prior to the vehicle rolling over, and wherein the maximum lateral acceleration includes a gravity component of the vehicle; and
        logic configured to determine if the actual lateral acceleration is more than a predefined percentage of the maximum lateral acceleration.

10. The system of claim 9, further comprising logic configured to provide a driver of the vehicle with a warning if the actual lateral acceleration is more than the predefined percentage of the maximum lateral acceleration.

11. The system of claim 9, further comprising logic configured to report a violation performed by a driver of the vehicle if the actual lateral acceleration is more than the predefined percentage of the maximum lateral acceleration.

12. The system of claim 9, wherein the positional data is gathered by a global positioning system.

13. The system of claim 9, where the radius of curvature is determined by determining a radius of a circle that passes through multiple positions within a curved line of travel of the vehicle.

14. The system of claim 9, wherein the determining of a maximum lateral acceleration of the vehicle further comprises:
   determining an angle $\alpha$, where the angle $\alpha$ is an angle between a direction of gravity and a line drawn from a center of gravity of the vehicle to a tire of the vehicle that is on an outside of a turn when the vehicle is turning; and
   multiplying gravity by a tangent of the angle $\alpha$ resulting in the maximum lateral acceleration.

* * * * *